United States Patent [19]

Amano

[11] 4,037,224
[45] July 19, 1977

[54] SIGNAL STORING AND READ-OUT ARRANGEMENT OF VIDEO DISPLAY SYSTEM WITH A CROSSED-GRID FLAT DISPLAY PANEL

[75] Inventor: Yoshifumi Amano, Zushi, Japan

[73] Assignee: Sony Corporation, Tokyo, Japan

[21] Appl. No.: 606,107

[22] Filed: Aug. 20, 1975

[30] Foreign Application Priority Data

Aug. 29, 1974 Japan .................................. 49-99236

[51] Int. Cl.² ............................................. G06F 3/14
[52] U.S. Cl. ................................. 340/324 M; 340/340
[58] Field of Search .............. 340/324 R, 324 M, 340, 340/336; 178/7.3 D

[56] References Cited

U.S. PATENT DOCUMENTS

| | | | |
|---|---|---|---|
| 3,761,617 | 9/1973 | Tsuchiya et al. .................. | 178/7.3 D |
| 3,845,243 | 10/1974 | Schmersal et al. .............. | 340/324 M |
| 3,863,023 | 1/1975 | Schmersal et al. .............. | 340/324 M |
| 3,883,778 | 5/1975 | Kaji et al. .......................... | 178/7.3 D |

Primary Examiner—Marshall M. Curtis
Attorney, Agent, or Firm—Lewis H. Eslinger; Alvin Sinderbrand

[57] ABSTRACT

A video display system employing a flat display panel of the crossed-grid or X-Y matrix type, signal sampling means, and "write in" and "read out" memory circuits serially connected between the signal sampling means and the display panel, is provided with a novel signal control means connected to the "write in" and "read out" memory circuits whereby the number of lines or leads for distributing signals mainly from the "read out" memory circuits to the display panel is greatly reduced. The sampled signals are digitally coded and transmitted sequentially to the "write in" memory circuits during an effective picture period of a horizontal scanning period. Each of the "read out" memory circuits includes a plurality of serially connected memory devices forming a shift register and has a single input terminal to which signals are transmitted from the corresponding "write in" memory circuit in a short interval between successive effective picture periods, and a single output terminal connected to a corresponding one of the Y-driving circuits of the display panel. The signals are read out from lower bits to higher bits with different intervals corresponding to the weight of the digitally coded signal so as to drive each Y-driving circuit with the signals read out from the output terminal of the respective "read out" memory circuit.

2 Claims, 28 Drawing Figures

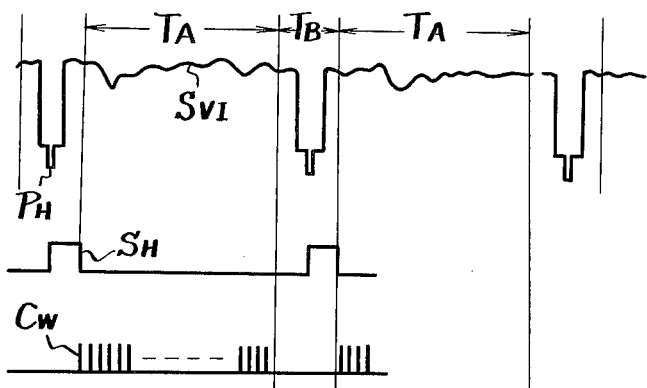

bits to higher bits with different intervals corresponding to the weight of the digitally coded signal.

In this system the signal transmission is made efficient and simplified, so that the number of signal distribution lines or leads is much reduced.

This invention may be better understood, however, when the following detailed description is read in connection with the accompanying drawings.

DESCRIPTION OF THE PREFERRED EMBODIMENT

In order to better understand the present invention, the prior art video display system will be described with reference to FIGS. 1 and 2A to 2J.

Figure 1:
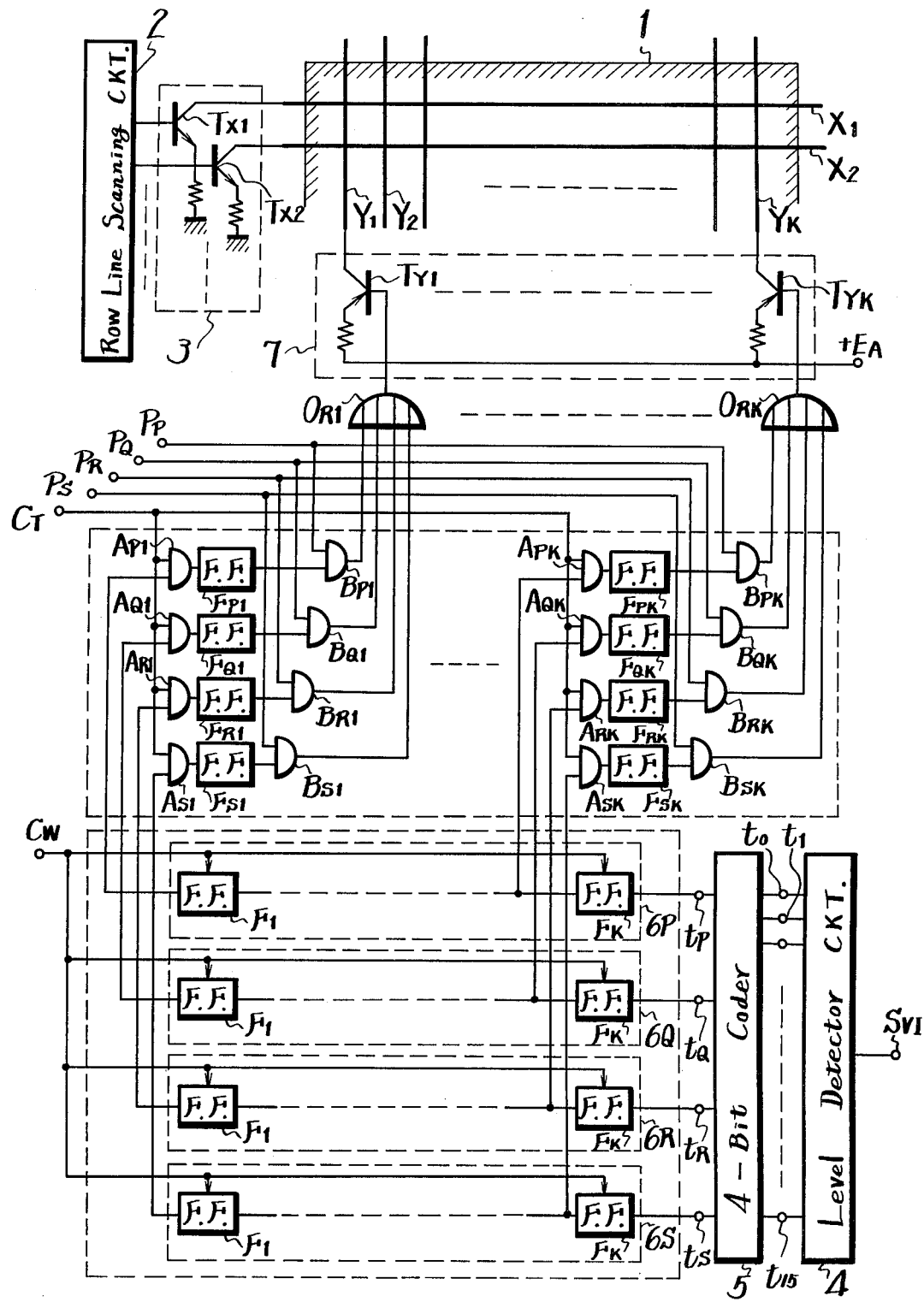
FIG. 1 is a block diagram of a video display system according to the prior art.
Figure 2:
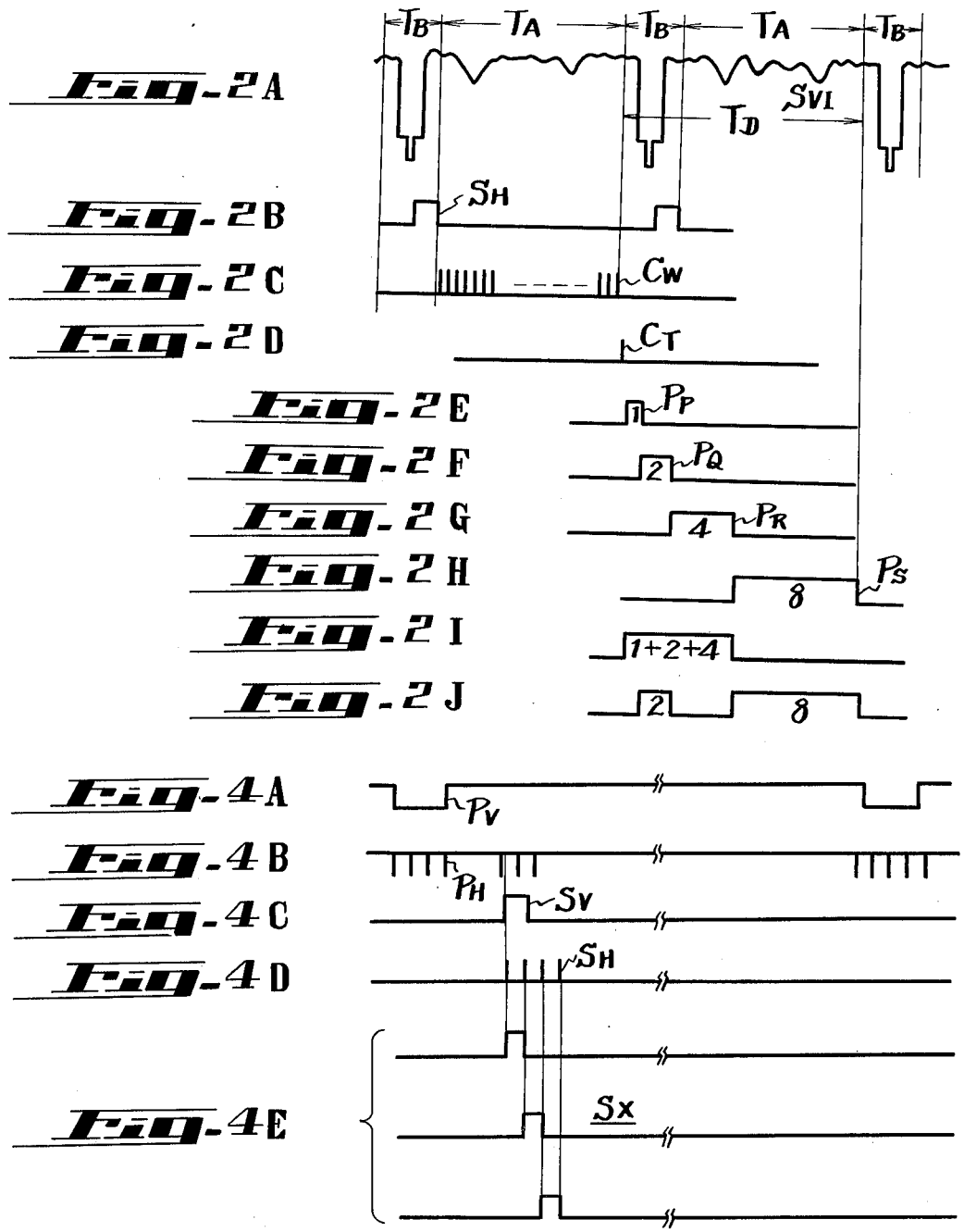
FIGS. 2A – 2J, inclusive, are waveform diagrams to which reference will be made in explaining the operation of the video display system shown in FIG. 1.

In FIG. 1, reference numeral 1 designates a video display panel or flat panel such as, for example, of a discharge tube of X–Y matrix type which has a plurality of parallel row lines $X_1, X_2, \ldots$ and a plurality of parallel column lines $Y_1, Y_2, \ldots Y_K$ perpendicular to the former (K being a positive integer). In this case, by way of example, the row lines $X_1, X_2, \ldots$ serve as cathode electrodes, while the column lines $Y_1, Y_2, \ldots Y_K$ serve as anode electrodes, respectively. The vertical and horizontal start pulse signals obtained from the vertical and horizontal synchronizing signals are supplied to a row line scanning circuit 2 which then produces at its plural output terminals driving pulses which are shifted or delayed by one horizontal scanning period, respectively. The driving pulses are then supplied to a row line driving circuit 3 whose driving transistors $T_{X1}, T_{X2}, \ldots$ are made conductive sequentially in a delayed or shifted manner by one horizontal scanning period, respectively. A video signal $S_{VI}$, such as is shown in FIG. 2A, from a video detector circuit (not shown) is supplied to a level detector circuit 4 which divides the level of the video signal $S_{VI}$ by, for example, 16 steps and delivers at its output terminals $t_0, t_1, \ldots t_{15}$ output signals in accordance with the divided levels. The output signals from the level detector circuit 4 are supplied to a 4-bit coder 5 which produces 4-bit binary coded signals at its output terminals $t_P, t_Q, t_R$ and $t_S$, respectively. The respective bit signals obtained at the terminals $t_P, t_Q, t_R$ and $t_S$ are applied to "write in" memory circuits $6_P, 6_Q, 6_R$ and $6_S$ each of which comprises flip-flop circuits $F_1, \ldots F_K$ provided in number in correspondence with the column lines $Y_1, \ldots Y_K$. The flip-flop circuits $F_1$ to $F_K$ operate as shift registers, respectively. The shift registers forming the respective "write in" memory circuits $6_P$ to $6_S$ are controlled with a clock pulse $C_W$ such as is shown in FIG. 2C. Thus, the video signal $S_{VI}$ shown in FIG. 2A is sampled in such a manner that, during an effective picture period $T_A$ in the horizontal scanning period, the video signal $S_{VI}$ is sequentially sampled, starting with a horizontal start pulse $S_H$ (shown in FIG.

SIGNAL STORING AND READ-OUT ARRANGEMENT OF VIDEO DISPLAY SYSTEM WITH A CROSSED-GRID FLAT DISPLAY PANEL

BACKGROUND OF THE INVENTION

1. FIELD OF THE INVENTION

This invention relates generally to a video display system and more particularly to such a system which includes a flat panel of X–Y matrix type and an improved signal storing and read-out means.

2. DESCRIPTION OF THE PRIOR ART

Recently, video display systems utilizing a flat panel of X–Y matrix type have become the object of considerable interest for television signal reproducing apparatus.

In such systems, different kinds of flat panels, such as, gas discharge panels, liquid crystal panels, electroluminescent panels and the like have been used, and extensive research has been conducted in respect to the flat panels and their driving circuits.

However, the video display systems of the prior art are usually complicated especially in their driving circuits.

In more detail, supposing that an X–Y matrix of a display panel is formed by 300 column lines and 300 row lines and an input signal is sampled and converted to a 4-bit digitally coded signal, the system is usually provided with $300 \times 4 = 1200$ memory devices for initially storing or writing the digitally coded signal and another 1200 memory devices for reading out the digitally coded signal. It will be apparent that a signal handling system for such a large number of memory devices is inevitably complicated and a very large number of signal distribution lines or leads are required in the memory devices and from the memory devices to the display panel to make the whole system complicated and big in size.

OBJECTS AND SUMMARY OF THE INVENTION

Accordingly, it is an object of this invention to provide an improved video display system of the type referred to above, and in which the inherent disadvantages of the prior art are avoided.

Another object of the invention is to provide an improved video display system having a flat panel of X–Y matrix type in which signals transmitting system in the memory circuits are made efficient and simplified.

A further object of the invention is to provide an improved video display system having a flat panel of X–Y matrix type in which the number of signal distribution lines or leads in much reduced.

The video display system of this invention includes a flat display panel of X–Y matrix type, signal sampling means, "write in" and "read out" memory circuits serially connected between the signal sampling means amd the display panel, and a noval signal control means connected to the "write in" and "read out" memory circuits and especially to the latter.

In accordance with an aspect of the invention, each of the "read out" memory circuits is formed as an $n$-bit shift register having an input terminal for receiving digitally coded signals from the corresponding one of the "write in" memory circuits and a single output terminal for driving the display panel.

The signal stored in the "read out" memory circuits is read out by means of a novel control means from lower 2B), at every clock pulse $C_W$. The sampling operation is performed at the respective output terminals $t_P$ to $t_S$ of the 4-bit coder 5, and the thus sampled signals are sequentially shifted in the respective "write in" memory circuits $6_P$ $6_S$ from the right to the left laterally in synchronism with the clock pulses $C_W$ and sequentially written or stored therein. When the sampled signals have been written or stored in all the flip-flop circuits $F_1$ to $F_K$ of the respective "write in" memory circuits $6_P$ to $6_S$, the stored signals in the flip-flop circuits $F_1$ to $F_K$ are shifted or transmitted simultaneously by a memory shift pulse $C_T$ (shown in FIG. 2D) through AND-circuits $A_{P1}$ to $A_{PK}$, $A_{Q1}$ to $A_{QK}$, $A_{R1}$ to $A_{RK}$ and $A_{S1}$ to $A_{SK}$ to flip-flop circuits $F_{P1}$ to $F_{PK}$, $F_{Q1}$ to $F_{QK}$, $F_{R1}$ to $F_{RK}$ and $F_{S1}$ to $F_{SK}$ which form "read out" memory circuits parallel with one another. As shown in FIGS. 2A to 2J, during the next horizontal period which includes a non-effective picture period $T_B$ and the effective picture period $T_A$ i.e. a display interval $T_D$, the signals stored in the "read out" memory circuits constituted by flip-flop circuits $F_{P1}$ to $F_{PK}$, $F_{Q1}$ to $F_{QK}$, $F_{R1}$ to $F_{RK}$ and $F_{S1}$ to $F_{SK}$ are read out with pulse signals $P_P$, $P_Q$, $P_R$ and $P_S$ (shown in FIGS. 2E, 2F, 2G and 2H), whose pulse widths are selected to be 1, 2, 4 and 8 sequentially, through AND-circuits $B_{P1}$ to $B_{PK}$, $B_{Q1}$ to $B_{QK}$, $B_{R1}$ to $B_{RK}$ and $B_{S1}$ to $B_{SK}$, respectively. The thus read-out signals from the flip-flop circuits $F_P$ to $F_S$ are derived, at every group corresponding to each of the column lines $Y_1$ to $Y_K$, and supplied through OR-circuits $O_{R1}$ to $O_{RK}$, to driving transistors $T_{Y1}$ to $T_{YK}$ of a column line driving circuit 7, respectively.

Accordingly, in such a case that the level of the video signal $S_{VI}$ at a certain sampling time in a certain effective picture period $T_A$ of a horizontal scanning period is at, for example, the 7th step in the 16 steps of 0, 1, 2, . . . 15, this video signal $S_{VI}$ is coded as 0111 by the 4-bit coder 5. During the next display period $T_D$, the corresponding column line is driven with the pulse signal whose pulse width is $1 + 2 + 4 = 7$ shown in FIG. 2I, and a discharging current flows between the corresponding column and row lines to make the brightness at the crossing point therebetween correspond to the 7th step. When the level of the video signal $S_{VI}$ is at the 10th step, it is coded by the 4-bit coder 5 as 1010. Then, the corresponding column line is driven during the display period $T_D$ with the pulse signal whose pulse width is $2 + 8 = 10$ shown in FIG. 2J and the brightness at the crossing point between the column line and the corresponding row line is made to correspond to the 10th step. Similarly, the time interval of discharge current flowing between the column and row lines is varied and hence the brightness at the crossing point therebetween is modulated or controlled to display a picture on the display panel 1.

With the prior art video display system constructed as above, a large number of leads is required for reading out the signals from the "read out" memory circuits. By way of example, if the video signal is coded as 4 bits as shown in FIG. 1 and the number of the column lines is 300, $4 \times 300$ or 1200 of leads are required for reading out the signals. Similarly, the same number of leads are also necessary for deriving the read-out signals of the respective bits in each group at every column line. Thus, the wiring becomes very complicated.

An embodiment of the video display system according to the present invention which is free from the defects of the above mentioned prior art system will be described with reference to FIGS. 3, 4A to 4E and 5A to 5K.

Figure 3:
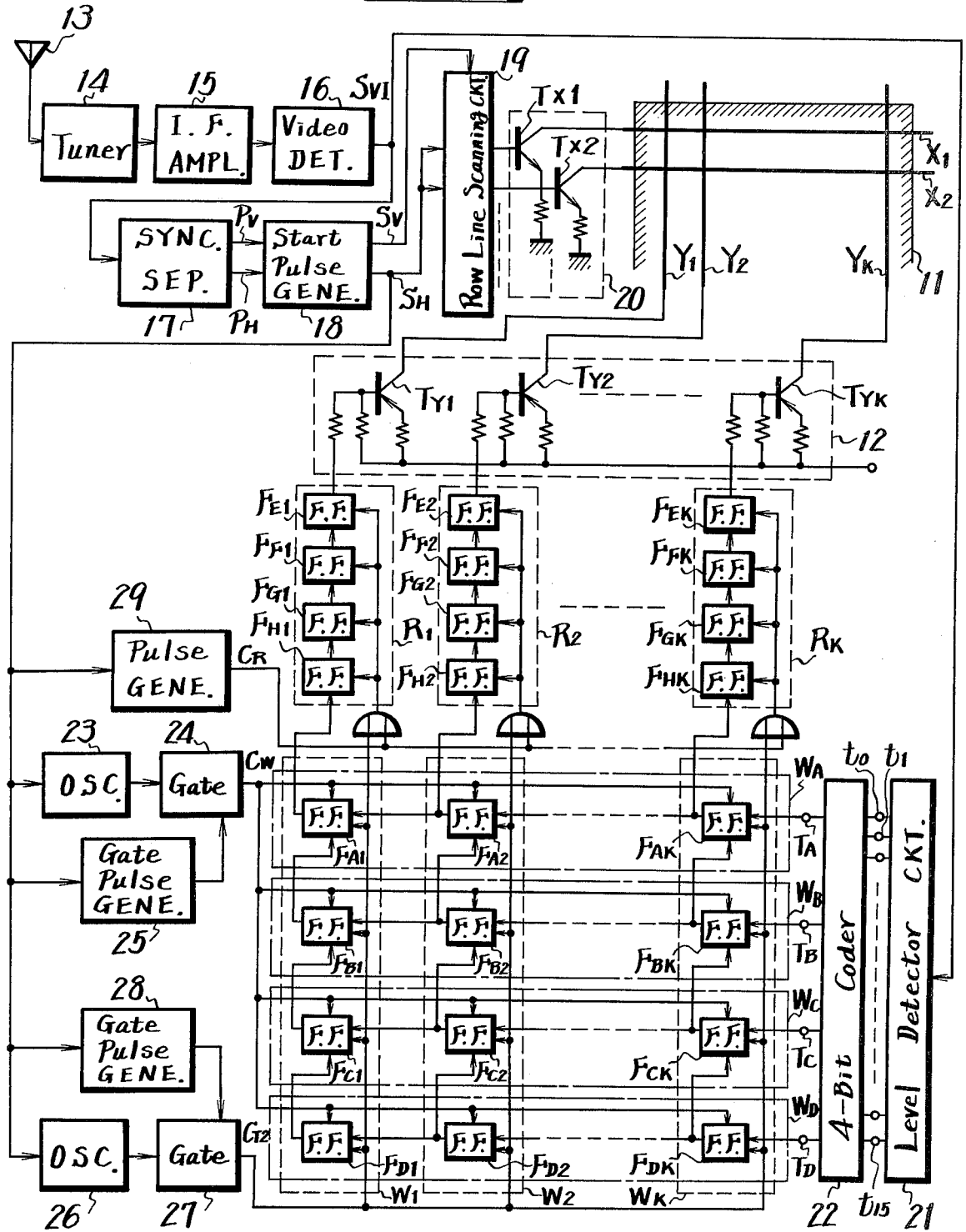
FIG. 3 is a block diagram of a video display system according to one embodiment of the present invention, and FIGS. 4A – 4E and FIGS. 5A – 5K, inclusive, are waveform diagrams to which reference will be made in explaining the operation of the video display system of the invention shown in FIG. 3.

In FIG. 3, reference numeral 11 designates a display panel of a discharge tube of the same type as is shown in FIG. 1. This display panel 11 comprises a plurality of parallel row lines $X_1, X_2, \ldots$ and a plurality of parallel column lines $Y_1, Y_2, \ldots Y_K$ (K being a positive integer) which are perpendicular to the row lines $X_1, X_2, \ldots$ In this case, the row lines $X_1, X_2, \ldots$ serve as cathode electrodes and the column lines $Y_1, Y_2, \ldots Y_K$ serve as anode electrodes, respectively.

In accordance with this invention, "write in" memory circuit $W_1, W_2, \ldots W_K$ each of which consists of, for example, 4 bits are provided for the column lines $Y_1, Y_2, \ldots Y_K$, respectively. The "write in" memory circuits $W_1, W_2, \ldots W_K$ include 4 flip-flop circuits $F_{A1}$ to $F_{D1}$, $F_{A2}$ to $F_{D2}, \ldots$ and $F_{AK}$ to $F_{DK}$, respectively. The flip-flop circuits $F_{A1}$ to $F_{D1}$, $F_{A2}$ to $F_{D2} \ldots F_{AK}$ to $F_{DK}$ are connected in such a manner that they form shift registers in the respective memory circuits $W_1, W_2, \ldots W_K$ in the longitudinal direction. These flip-flop circuits are further connected such that those corresponding to the respective column lines $Y_1, Y_2, \ldots Y_K$ at every bit are connected to form lateral shift registers, respectively, and hence to form "write in" memory circuits $W_A, W_B, W_C$ and $W_D$ at every bit. For the respective column lines $Y_1, Y_2, \ldots Y_K$, these are further provided "read out" memory circuits $R_1, R_2, \ldots R_K$ of 4 bits. The "read out" memory circuits $R_1, R_2, \ldots R_K$ include 4 flip-flop circuits $F_{E1}$ to $F_{H1}$, $F_{E2}$ to $F_{H2}, \ldots F_{EK}$ to $F_{HK}$ each group of which are connected to form longitudinal shift registers, respectively. The output sides of flip-flop circuits $F_{A1}$ to $F_{AK}$, which correspond to the lowest bits of the "write in" memory circuits $W_1$ to $W_K$, are connected to the input sides of the flip-flop circuits $F_{H1}$ to $F_{HK}$ of the "read out" memory circuits $R_1$ to $R_K$, respectively to longitudinally transmit the signals from the "write in" memory circuits $W_1$ to $W_K$ to the "read out" memory circuits $R_1$ to $R_K$, respectively. The base electrodes of driving transistors $T_{Y1}, T_{Y2}, \ldots T_{YK}$ in a column line driving circuit 12 are connected to the output sides of the flip-flop circuits $F_{E1}, F_{E2}, \ldots F_{EK}$ of the "read out" memory circuits $R_1$ to $R_K$, respectively.

A television signal received by an antenna 13 is supplied through a tuner 14 and an IF amplifier circuit 15 to a video detector circuit 16. The video signal $S_{VI}$ obtained from the video detector circuit 16 is applied to a sync. separator circuit 17 which then produces vertical and horizontal synchronizing signals $P_V$ and $P_H$ as shown in FIGS. 4A and 4B, respectively. The signals $P_V$ and $P_H$ are applied to a start pulse generator 18 which then produces vertical and horizontal start pulses $S_V$ and $S_H$ such as shown in FIGS. 4C and 4D, respectively. The start pulses $S_V$ and $S_H$ are supplied to a row line scanning circuit 19 formed of shift registers which produces at its plural output terminals pulses $S_X$ which are sequentially shifted or delayed by one horizontal scanning period as shown in FIG. 4E. The pulses $S_X$ are applied to a row line driving circuit 20 to make its driving transistors $T_{X1}, T_{X2}, \ldots$ conductive sequentially in a delayed manner by one horizontal scanning period and thereby to make the row lines or cathode electrodes $X_1, X_2, \ldots$ nearly at ground potential sequentially at every one horizontal scanning period.

The video signal $S_{VI}$ (refer to FIG. 5A) from the video detector circuit 16 is supplied to a level detector circuit 21 which detects the video signal $S_{VI}$ with its level divided into, for example, 16 steps and delevers the divided outputs to its output terminals $t_0, t_1, \ldots t_{15}$ in response to the divided levels. The output signals at the terminals $t_0, t_1, \ldots t_{15}$ are supplied to a 4-bit coder 22 to be 4-bit binary coded signals at output terminals $T_A$, $T_B$, ... $T_D$ of the 4-bit coder 22. The 4-bit binary coded signals are supplied to the "write in" memory circuits $W_A$, $W_B$, ... $W_D$ at the respective bits. The horizontal start pulse $S_H$ (shown in FIG. 5B) from the start pulse generator 18 is further supplied to an oscillator circuit 23 to drive the same in synchronism therewith. The output signal from the oscillator circuit 23 is supplied to a gate circuit 24. The horizontal start pulse $S_H$ is also supplied to a gate pulse generator circuit 25 whose output gate pulse is supplied to the gate circuit 24 to control the same. Thus, the gate circuit 24 produces a train of clock pulses $C_W$ during the effective picture period $T_A$ of the horizontal scanning period as shown in FIG. 5C. The clock pulse $C_W$ is supplied to the flip-flop circuits $F_{A1}$ to $F_{AK}$, ... $F_{D1}$ to $F_{DK}$ of the "write in" memory circuits $W_A$ to $W_D$, respectively, to sample the signals at the respective bits supplied to the respective "write in" memory circuit $W_A$ to $W_D$ and to laterally transmit the sampled values from the right to the left sequentially. Thus, the sampled values are written in the "write in" memory circuits $W_1$ to $W_K$ corresponding to the column lines $Y_1$ to $Y_K$, respectively.

Another oscillator circuit 26 is also driven with the horizontal start pulse $S_H$ in synchronism therewith and its output is supplied to a gate circuit 27. The horizontal start pulse $S_H$ is also supplied to a gate pulse generator circuit 28 whose output pulse or gate is supplied to the gate circuit 27 to control the same. Thus, the gate circuit 27 produces, at the time when the "write in" operations to all the "write in" memory circuits $W_1$ to $W_K$ are completed, that is, immediately after the effective picture period $T_A$, four closely occurring pulses $C_{T2}$ as shown in FIG. 5D.

These pulses $C_{T2}$ are supplied, as clock pulses or shift pulses in the longitudinal direction, to all the flip-flop circuits of the "write in" memory circuits $W_1$ to $W_K$ and to all the flip-flop circuits of the "read out" memory circuits $R_1$ to $R_K$. At the end of the effective picture period $T_A$, the signals written or stored in the "write in" memory circuits $W_1$ to $W_K$ are longitudinally transmitted with the pulses $C_{T2}$ to the "read out" memory circuits $R_1$ to $R_K$. The time period $T_C$ within which the signals are transmitted with the pulses $C_{T2}$ from the "write in" memory circuits to the "read out" memory circuits is very short or nearly instantaneous, so that the period $T_C$ may be deemed as substantially zero.

A pulse generator circuit 29 is driven with the horizontal start pulse $S_H$ and then sequentially produces pulses $C_{R1}$, $C_{R2}$ and $C_{R3}$ which are delayed by $(1/15)T_H$, $(3/15)T_H$ and $(7/15)T_H$ from the transfer of signals with the pulses $C_{T2}$, as shown in FIG. 5E. The pulses $C_{R1}$, $C_{R2}$ and $C_{R3}$ are supplied to all the flip-flop circuits of the "read out" memory circuits $R_1$ to $R_K$ as readout pulses in the longitudinal directions, and the signals transmitted with the pulses $C_{T2}$ to the "read out" memory circuits $R_1$ to $R_K$ are sequentially transmitted with the pulses $C_{R1}$, $C_{R2}$ and $C_{R3}$ to the final stage of flip-flop circuits $F_{E1}$ to $F_{EK}$, respectively, to read out the signals. The outputs from the flip-flop circuits $F_{E1}$ to $F_{EK}$ are applied to the transistors $T_{Y1}$ to $T_{YK}$ of the column line driving circuit 12 to drive the same.

Accordingly, as shown in FIGS. 5F to 5I, when the signal at the first bit of the sampling signals which are coded as the 4-bit signals is 1, a discharging current of predetermined magnitude or level flows during a time interval $T_1$ whose time widths $(1/15)T_H$; when the signal at the second bit is 1, the discharging current flows during a time interval $T_2$ whose time width is $(2/15)T_H$; when the signal at the third bit is 1, the discharging current flows during a time interval $T_3$ whose time width is $(4/15)T_H$; and so on. That is, during the display interval $T_D$ of one horizontal period $T_H$ which consists of the horizontal noneffective picture period $T_B$ after the signal transfer from the "write in" memory circuits $W_1$ to $W_K$ to the "read out" memory circuits $R_1$ to $R_K$ is finished and of the horizontal effective picture period $T_A$, the discharging currents are caused to flow with the time widths of such discharging currents being determined by the signals at the respective bits.

Accordingly, when the level of the sampled video signal $S_{VI}$ is, for example, at the 9th step of the steps 0, 1, 2, .... 15 and is coded as 1001, discharging currents of predetermined magnitude flow during the interval $T_1$ and $T_4$ as shown in FIG. 5J. In this case, the luminance becomes the 9th level as the integrated value of the discharging currents. Similarly, when the level of the sampled video signal $S_{VI}$ is, for example, at the 3rd step and coded as 0011, the discharging currents of predetermined magnitude flow during the intervals $T_1$ and $T_2$ as shown in FIG. 5K and the luminance thereof becomes the 3rd step. The above is similarly true of the other steps to carry out the luminance-modulation.

During the next horizontal effective picture period $T_A$, the video signal at the next horizontal period is similarly sampled with the above write-in clock pulse $C_W$ in the "write-in" memory circuits $W_1$ to $W_K$ and then transmitted to be written to repeat the above operation. Thus, a picture is reproduced on the display panel 11.

With the apparatus of the present invention described above, the reading out of signals from four memory elements of the "read out" memory circuits is carried out longitudinally or in a series manner, so that relatively simple wiring is required therefor.

In the illustrated and above described embodiment of the present invention the transfer of signals from the "write in" memory circuits to the "read out" memory circuit is sequentially carried out in a series manner, but it may be possible, by providing connections between the flip-flop circuits $F_{A1}$ to $F_{AK}$ and the flip-flop circuits $F_{E1}$ to $F_{EK}$; between the flip-flop circuits $F_{B1}$ to $F_{BK}$ and the flip-flop circuits $F_{F1}$ to $F_{FK}$ ...; and between the flip-flop circuits $F_{D1}$ to $F_{DK}$ and the flip-flop circuits $F_{H1}$ to $F_{HK}$, to carry out the signal transfer simultaneously.

The above described video display system of the present invention has employed a flat panel in which discharge light emission is used, but it will be apparent that the video display system of the present invention can be applied to flat display panels in which light emission is achieved by liquid crystals, electroluminescence and the like.

Having described an illustrative embodiment of the invention, it will be apparent that many modifications and variations could be effected therein by one skilled in the art without departing from the spirit and scope of the novel concepts of the present invention as defined in the appended claims.

What I claim is:

1. A video display system comprising:

A. a display panel including a group of first parallel electrodes and a group of second parallel electrodes substantially perpendicular to said first electrodes;

B. a group of first driving circuits connected to said first parallel electrodes respectively;

C. a group of second driving circuits connected to said second electrodes respectively;

D. a video signal source for supplying a video signal;

E. a sync. separator connected to said video signal source for separating horizontal and vertical synchronizing signals from said video signal;

F. means supplied with said horizontal synchronizing signals for driving said first driving circuits sequentially in synchronism with said horizontal synchronizing signals;

G. signal level detecting means connected to said video signal source for detecting the level of the video signal and providing a corresponding digitally coded output signal of $n$ bits where $n$ is a positive integer;

H. a group of first memory circuits connected to said second driving circuits respectively, each of the first memory circuits including $n$-bit memory devices serially connected to form a shift register, and having a single input terminal and a single output terminal which is connected to the corresponding one of said second driving circuits;

I. a group of second memory circuits connected to the input terminals of said first memory circuits respectively, each of the second memory circuits consisting of $n$-bit memory devices;

J. first control means connected between said level detecting means and said second memory circuits for transmitting the digitally coded output signal of the former sequentially to the latter during an effective picture period of a horizontal scanning period;

K. second control means connected between said first and second memory circuits for transmitting signals from the latter to the former in a short interval after said effective picture period and prior to the next effective picture period; and L. third control means connected with said first memory circuits for reading out signals of the first memory circuits from lower bits to higher bits with different intervals corresponding to the weight of the digitally coded signal and driving the second driving circuits with the signals read out from the first memory circuits.

2. A video display system according to claim 1, wherein said memory devices of said second memory circuits form a group of first $n$-bit shaft registers longitudinally and serially connected to the $n$-bit shift registers of said first memory circuits respectively and at the same time said memory devices of said second memory circuits also form a group of second shift registers laterally connected to said level detecting means respectively; said first control means transmits the digitally coded output signal of said level detecting means sequentially to said second memory circuits by means of the group of said second shift registers; and said second control means transmits signals from said second memory circuits to said first memory circuits by means of the group of said first shift registers.

* * * * *